April 16, 1957 — C. W. MOTT — 2,788,679
DIFFERENTIAL GEARING UNIT
Original Filed July 29, 1948
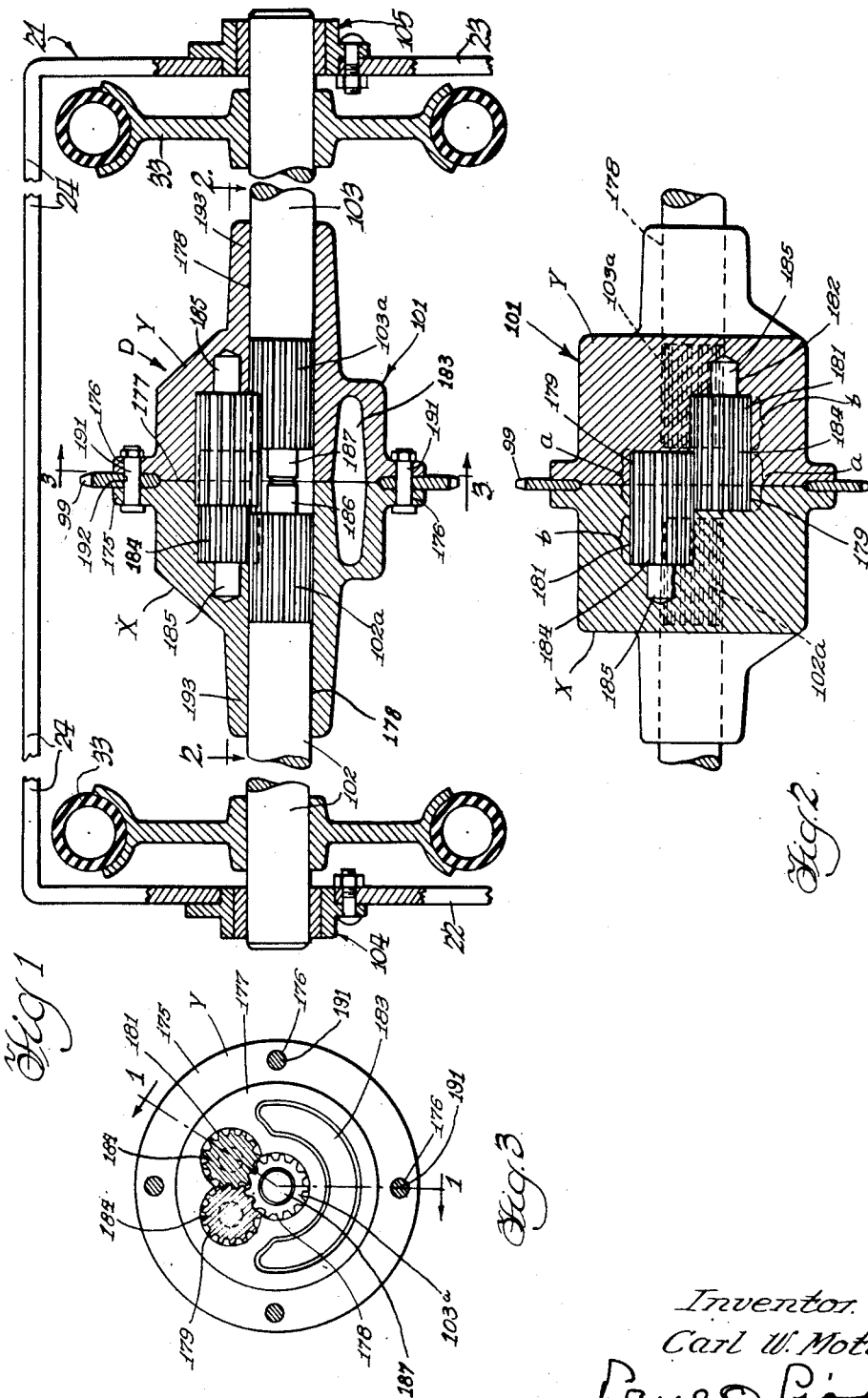
Inventor.
Carl W. Mott

United States Patent Office 2,788,679
Patented Apr. 16, 1957

2,788,679

DIFFERENTIAL GEARING UNIT

Carl W. Mott, Lake Ozark, Mo., assignor to International Harvester Company, a corporation of New Jersey Original application July 29, 1948, Serial No. 41,343, now Patent No. 2,696,889, dated December 14, 1954. Divided and this application October 7, 1952, Serial No. 313,439

5 Claims. (Cl. 74—714)

This invention relates to gear type differential drive units for vehicle running gear and more particularly concerns such a unit wherein the gear carrier is adapted to be supported solely upon axially opposed inner end portions of coaxial shafts journaled therein and driven thereby. This application is a division of my patent application Serial No. 41,343 filed July 29, 1948, Patent No. 2,696,889, Dec. 14, 1954, for Power-Driven Lawn Mower.

An important object of this invention is the provision of a novel differential drive unit wherein a planet gear carrier serves as a casing for the gears of the unit and for gearing lubricant.

Another object is the provision of a differential gearing unit comprising a planet gear carrier having planet gears journaled therein for rotation about axes in laterally spaced parallelism with the principal axis of rotation of the carrier, said gears having respective portions meshed with one another and other portions respectively meshable with teeth of gears upon driven shafts projected in opposite directions into the carrier coaxially with its principal axis. A planetary gearing unit having elements arranged in this manner is adapted to be conveniently assembled with the driven shafts at the time of fabricating a vehicle running gear which includes the differential gear unit and said shafts.

A further object is the provision of a differential gearing unit according to the next preceding object wherein the carrier is made up of two essentially identical counterparts assembled with one another at a plane disposed normally to the principal axis of the unit and wherein the carrier counterparts contain semi-cylindrical recesses which cooperate when the counterparts are assembled to form pocket-like bearings for receiving the planet gears and maintaining the same meshed with one another. Such identically constructed planet gear carrier components diminishes the number of stock parts necessary for fabricating the unit and also diminishes the time required for assembling the unit.

The above and other desirable objects inherent in and encompassed by the invention are elucidated in the ensuing description of the appended claims and annexed drawings, wherein:

Figure 1 is a vertical sectional view through a differential gearing unit constituting a preferred form of the invention, and also showing parts of a running gear frame supported by driven shafts extending coaxially oppositely from the unit and traction wheels constrained for rotation with the driven shafts, this view being taken at the junction of planes represented by the line 1—1 in Figure 3;

Figure 2 is a vertical sectional view taken at the plane indicated by the line 2—2 in Figure 1;

Figure 3 is a horizontal transverse sectional view taken substantially on the line 3—3 of Figure 1.

With continued reference to the drawings, the entire disclosure in Figure 1 is a fragmentary part of a vehicle running gear which comprises a frame 21 having laterally spaced side frame members 22 and 23 connected together at one end by a cross frame member 24. A differential gear carrier 101 (which also serves as a gear and lubricant casing) is rotatable by power transmitted thereto through a sprocket 99, and when so rotated the differential gearing unit including such casing is effective for causing differential rotation of axle shafts 102 and 103 projecting oppositely therefrom. Traction wheels 33, of which the rightmost is shown fragmentarily, are respectively constrained for rotation with the shafts 102 and 103. These axle shafts 102 and 103 which constitute a traction wheel shaft structure 102—103 are carried rotatively in bearing units 104 and 105 which are supported in the side frame members 22 and 23.

The differential gearing unit, designated D in its entirety, comprises identical casing and gear carrier components X and Y. Referring particularly to the casing component Y, it can be seen in Fig. 3 that this component has a circular flange 175 containing holes 176. A circular and flat inner end face 177 of the casing component Y is intersected by a coaxial gear receiving bore 178. This bore 178 extends completely through component Y in an endwise direction. A pair of cylindrical recesses 179 and 181 are formed in intercommunicative contiguity with respect to one another with their axial centers spaced radially from the center of the bore 178 and spaced apart circumferentially of the bore 178. It can be also seen in Fig. 3 that the cylindrical recesses 179 and 181 communicate radially inwardly with the bore 178. In Fig. 2 it can be seen that the cylindrical recess 179 has less depth than the recess 181 and that the recess 181 has a counterbore 182. An arcuate recess 183 is formed in the face 177 to diminish weight and conserve material.

When the two casing counterparts X and Y are assembled, the shallow recess 179 of each is disposed in coaxial relation with the deep recess 181 of the other. When the casing counterparts are being assembled, a pair of long gears 184, which are identical, will be inserted into the structure as well as the chain sprocket 99.

A cylindrical bearing extension 185 of one of the gears will be disposed in the counterbore 182 of the casing component Y, while a cylindrical bearing extension 185 of the other gear will be placed in the counterbore at the bottom of the deep recess in the casing component X. The shallow recess 179 of each casing component cooperates with the deep cylindrical recess 181 of the other component to form a gear receiving pocket 179—181. The cylindrical walls of these pockets are equal in diameter to the addendum circle diameter of the gears disposed therein so these pockets serve as bearings facilitating rotation of the gears about their principal axes. Each pocket 179—181 has an inner-end portion $a$ which overlaps in an axial direction with the corresponding inner-end portion of the other pocket, and these inner-end portions of the pockets are in intercommunicative contiguity wherefore the portions of the gears 184 embraced by these inner-end portions of the pockets intermesh. Outer end portions $b$ of the gear receiving pockets 179—181 are in intercommunicative contiguity with the interior of the casing provided by the axial bores 178, wherefore the outer end portions of the gears 184 project peripherally into the casing for being meshed respective with the teeth of gears 102-$a$ and 103-$a$ pursuant to the axle shafts 102 and 103 being slid endwise into the casing bores 178. The addendum circle of the teeth of the gears 102-$a$ and 103-$a$ do not exceed the diameter of the shafts 102 and 103 with which these gears are integral.

Extensions 186 and 187 on the inner ends of the axle shafts 102 and 103 abut to limit the distance these shafts can be inserted endwise into the casing X—Y so each gear 102-$a$ and 103-$a$ will mesh with only an outer end portion $b$ of a respective one of the gears 84.

The casing components X and Y and the sprocket 99 are held in assembly by bolts 191 which pass through holes 192 in the sprocket.

This differential unit has the advantage of being made from pairs of simple identical parts. It has the further advantage that the casing components X and Y and the gears 184 together with the sprocket 99 can be preassembled and stored until the complete running gear is being assembled, at which time the unit is completed by simply inserting the gear ends of the axle shafts 102 and 103 endwise into the casing bores 178. The whole differential unit is supported upon the axle shafts of which inner-end portions adjacently to the gears 102 and 103 are journaled within bearing portions 193 of the bores 178.

In the operation of the differential unit, assuming the shaft 102 and the wheel 33 attached thereto to be held against rotation while the sprocket is rotated counter-clockwise as viewed in Fig. 3, the planet gears 184 will be given orbital movement about the common axis of the shafts 102 and 103 at the speed of rotation of the sprocket and hence of the carrier 101. Since the gear 102-a will be constrained with the shaft 102 against rotation the planet gear 184 in mesh with such constrained gear 102-a will roll about the toothed periphery thereof to incur counter-clockwise rotational movement about its own axis in addition to the orbital movement. Thus clockwise rotational movement is imparted to the planet gear 84 meshed with the gear 103-a whereby this latter gear, the shaft 103 and the wheel 33 on shaft 103 are rotated counter-clockwise at an overspeed with respect to the speed the sprocket 99 and the carrier 101 are rotated. Inasmuch as the sun gears 102-a and 103-a are equal in diameter and the planet gears 184 are also equal in diameter the rotational speed at which the shaft 103 and the wheel 33 thereon are driven will be twice that of the sprocket and carrier. Reversing the direction of drive of the carrier 101 will change the direction of rotation of the gears 84 and 103-a but the shaft 103 will again be rotated at twice carrier speed. Also since the structure of the differential unit is symmetrical, rotation of the carrier 101 in either direction while the wheel on shaft 103 is held against rotation will cause the shaft 102 and wheel 33 thereon to be rotated in the same direction of the carrier but at twice the speed thereof. The unit D therefore performs the functions of a differential unit by providing tractive drive through both wheels on the driven shafts thereof irrespective of these wheels having different relative speeds.

Having described a preferred form of the invention with the view of clearly and concisely illustrating the same, I claim:

1. A motor-driven running gear comprising a frame having laterally-spaced side members, bearing means in said side members, a traction-wheel driving shaft structure including coaxial oppositely extending shafts having outer end portions supported in said bearing means, said shafts also having bearing portions adjacently to inner end portions thereof and said inner end portions being formed with gear teeth of which the addendum circle diameter does not exceed the diameter of the adjacent bearing portions, a differential gear casing having opposite end walls containing coaxial internal bearings respectively endwise receivable of the shaft bearing portions, said casing being rotatively supported on the shaft bearing portions and retaining the shafts in coaxial relation, and differential gearing comprising gears enclosed by and journaled in said casing end walls for rotation about axes in parallelism with the casing bearings and disposed for being meshed respectively with the gear teeth on the shafts when the latter are inserted endwise into the casing, and said gearing being operable for differentially driving said shafts when the casing is rotated coaxially thereof.

2. In a differential gearing unit for differentially driving coaxial oppositely extending shafts having bearing portions adjacent to inner end portions which are formed with gear teeth of which the addendum circle diameter does not exceed the diameter of the adjacent bearing portions, a differential gear casing having opposite end walls containing coaxial internal bearings through which the inner ends of the shafts are endwise insertable to place the gear teeth thereof interiorly of the casing and to place the bearing portions thereof in journaled relation with said bearings, said end walls also containing cylindrical gear-receiving and journalling pockets in parallelism with the internal bearings but with their axes spaced radially from the axis of said bearings and also spaced circumferentially of the bearing axis, said casing being rotatively supported on said shaft bearing portions and rotatable about the axis of said bearings, and differential gearing comprising intermeshed gears respectively in the pockets wherein such gears are journalled by addendum portions of their teeth bearing against the cylindrical inner periphery of such pockets, and portions of said gears being disposed for being meshed respectively with the teeth on said shafts when the latter are inserted endwise through said bearings into the casing, and said gearing being operable for differentially driving said shafts when the casing is rotated.

3. In a differential gearing unit for differentially driving coaxial oppositely extending shafts having bearing portions adjacent to inner end portions which are formed with gear teeth of which the addendum circle diameter does not exceed the diameter of the adjacent bearing portions, a differential gear casing having opposite end walls containing coaxial bearings through which the inner ends of the shafts are endwise insertable to place the gear teeth thereof interiorly of the casing and to place the bearing portions thereof in journaled supporting relation with said bearings, said casing end walls having cylindrical gear-receiving bearing pockets arranged in parallelism with the casing bearings, said pockets having their axial centers spaced radially from and circumferentially of the casing bearings but being in intercommunicative contiguity and also communicating radially inwardly with the interior of the casing, said pockets having inner and outer ends of which the outer end of each is nearer to a respective casing end wall than the inner end of the other pocket wherefore only inner end portions of the pockets are transversely aligned, elongated gears axially substantially coextensive with said pockets and rotatively disposed respectively therein with the addendum portions of their teeth in sliding journalled relation against the cylindrical inner peripheries of such pockets, and said gears being meshed with one another only at transversely aligned inner end portions embraced by the transversely aligned inner end portions of the pockets, said gears presenting teeth at a side of outer end portions thereof into the casing in position for being respectively meshed by teeth on the shafts pursuant to insertion of the shafts endwise through the casing end wall bearings.

4. In a differential gearing unit, a first gear carrier and casing component having a face at an end thereof and a cylindrical gear-and-shaft receiving and journalling bore extending inwardly through the opposite end thereof and of undiminished diameter outwardly from an inner gear-journalling portion thereof to accommodate axial insertion of a gear inwardly through such bore into such inner portion, said gear-journalling portion having a circumferential gap into which teeth of such an inserted gear are radially projectable, said component including relatively deep and shallow gear-receiving recesses extending axially into said end face, said recesses having respective axes in parallelism with said bore and spaced radially from and circumferentially of said bore but being in intercommunicative contiguity to facilitate intermeshing of planet gears they are adapted to respectively coaxially receive, the deeper of said recesses having a side wall gap that coincides with the gap in the gear-journalling portion of said bore and through which said recess is communicative with such gear-journalling portion of the bore, a second casing component with a face, a bore and recesses essentially respectively identical with those of the first component, said components being adapted for assembly with their end faces in opposed contiguity while the bores of the components are in coaxial relation and the relatively shallow recess of each component is in axial communicative registry with the deep recess of the other component whereby the axially registered recesses jointly form respective gear-receiving pockets having transversely aligned intercommunicative inner end portions and having outer end portions which are respectively transversely aligned with the casing component bores and intercommunicative therewith through said gaps, and means for securing said components in such assembly.

5. The combination set forth in claim 4 wherein there are elongated planet gears substantially axially coextensive with and within said pockets and journaled in said unit to rotate respectively coaxially with said pockets, said gears having intermeshed portions embraced by the inner end portions of the pockets, and outer end portions of said gears projecting radially through said gaps respectively into the gear-receiving bores into position wherein teeth thereon are axially meshable with teeth of gears axially inserted into such bores for journalled mounting therein.

References Cited in the file of this patent

UNITED STATES PATENTS

| | | |
|---|---|---|
| 311,132 | Latta | Jan. 20, 1885 |
| 410,425 | Matthews | Sept. 3, 1889 |
| 625,519 | Metz | May 9, 1899 |
| 754,914 | Bayley | Mar. 15, 1904 |
| 827,095 | Gray | July 31, 1906 |
| 1,018,535 | Warner | Feb. 27, 1912 |
| 1,138,900 | Smith | May 11, 1915 |
| 1,305,030 | Tibbetts | May 27, 1919 |
| 1,383,705 | Farnum | July 5, 1921 |

FOREIGN PATENTS

| | | |
|---|---|---|
| 323,933 | Great Britain | Jan. 16, 1930 |
| 364,767 | France | June 6, 1906 |